United States Patent
Katal (10) Patent No.: US 12,218,325 B2
(45) Date of Patent: *Feb. 4, 2025

(54) PROCESS FOR REMOVING IMPURITIES IN THE RECYCLING OF LITHIUM-ION BATTERIES

(71) Applicant: GREEN LI-ION PTE. LTD., Singapore (SG)

(72) Inventor: Reza Katal, Singapore (SG)

(73) Assignee: GREEN LI-ION PTE. LTD., Singapore (SG)

(*) Notice: Subject to any disclaimer, the term of this patent is extended or adjusted under 35 U.S.C. 154(b) by 0 days.

This patent is subject to a terminal disclaimer.

(21) Appl. No.: 18/379,807

(22) Filed: Oct. 13, 2023

(65) Prior Publication Data

US 2024/0047777 A1    Feb. 8, 2024

Related U.S. Application Data

(63) Continuation of application No. 18/112,818, filed on Feb. 22, 2023, now Pat. No. 11,876,196, which is a
(Continued)

(51) Int. Cl.
    *C22B 3/00*      (2006.01)
    *C22B 7/00*      (2006.01)
    *H01M 10/54*    (2006.01)

(52) U.S. Cl.
    CPC ............. *H01M 10/54* (2013.01); *C22B 7/007* (2013.01)

(58) Field of Classification Search
    CPC ......... C22B 3/26; C22B 23/043; C22B 7/005; C22B 3/08; C22B 1/005; C22B 3/37; H01M 10/54; H01M 6/52
See application file for complete search history.

(56) References Cited

U.S. PATENT DOCUMENTS

| | | |
|---|---|---|
| 3,690,844 A | 9/1972 | Flint et al. |
| 3,852,044 A | 12/1974 | Neitzel et al. |

(Continued)

FOREIGN PATENT DOCUMENTS

| | | |
|---|---|---|
| AU | 2018276326 B2 | 7/2021 |
| CA | 3085965 | 8/2019 |

(Continued)

OTHER PUBLICATIONS

Beer et al. Battery Recycling Process, Dec. 2019, See the Abstract, (Year: 2019).*

(Continued)

*Primary Examiner* — Anca Eoff
*Assistant Examiner* — Monique M Wills
(74) *Attorney, Agent, or Firm* — Harness Dickey & Pierce P.L.C.

(57) ABSTRACT

A method of treating a leaching solution derived from a black mass from spent lithium-ion batteries comprising setting pH of the leaching solution to about pH 1.2 to 2.5, adding iron powder to induce copper cementation, adding lime after copper cementation, and after adding lime, transiting pH of the leaching solution to about pH 6 to extract calcium fluoride, titanium hydroxide, aluminium hydroxide, iron hydroxide, and iron phosphate. A black mass recycling system comprising an impurity removal reactor configured to receive a sodium hydroxide feed, an iron powder feed, and a lime feed.

20 Claims, 4 Drawing Sheets

Related U.S. Application Data continuation of application No. PCT/SG2021/050496, filed on Aug. 24, 2021.

(60) Provisional application No. 63/069,488, filed on Aug. 24, 2020.

(56) References Cited

U.S. PATENT DOCUMENTS

| | | |
|---|---|---|
| 4,723,962 A | 2/1988 | Mehta |
| 5,160,631 A | 11/1992 | Frost et al. |
| 9,834,827 B2 | 12/2017 | Wang et al. |
| 10,023,464 B2 | 7/2018 | Cohen et al. |
| 10,522,884 B2 | 12/2019 | Wang et al. |
| 10,741,890 B2 | 8/2020 | Wang et al. |
| 11,127,992 B2 | 9/2021 | Wang et al. |
| 11,430,997 B2 | 8/2022 | Howe |
| 11,502,345 B2 | 11/2022 | Wang et al. |
| 11,508,999 B2 | 11/2022 | Morin et al. |
| 11,769,916 B2 | 9/2023 | Wang et al. |
| 11,827,998 B2 | 11/2023 | Wang et al. |
| 11,876,196 B2 | 1/2024 | Katal |
| 2007/0098609 A1 | 5/2007 | McConnell |
| 2012/0328494 A1 | 12/2012 | Dreisinger et al. |
| 2013/0302226 A1 | 11/2013 | Wang et al. |
| 2013/0312254 A1 | 11/2013 | Kim et al. |
| 2016/0115563 A1 | 4/2016 | Kotiranta et al. |
| 2017/0077564 A1 | 3/2017 | Wang et al. |
| 2018/0261894 A1 | 9/2018 | Wang et al. |
| 2019/0123402 A1 | 4/2019 | Wang et al. |
| 2021/0032721 A1 | 2/2021 | Hanisch et al. |
| 2021/0032724 A1 | 2/2021 | Maree et al. |
| 2021/0078013 A1 | 3/2021 | Kochhar et al. |
| 2021/0123119 A1 | 4/2021 | Oosterhof et al. |
| 2021/0324495 A1 | 10/2021 | Rohde et al. |
| 2021/0344058 A1 | 11/2021 | Liu et al. |
| 2021/0372001 A1 | 12/2021 | Wang et al. |
| 2021/0384563 A1 | 12/2021 | Gratz et al. |
| 2021/0391606 A1 | 12/2021 | Wang et al. |
| 2022/0017991 A1 | 1/2022 | Lee et al. |
| 2022/0131204 A1 | 4/2022 | Wang et al. |
| 2022/0166079 A1 | 5/2022 | Liu et al. |
| 2022/0205064 A1 | 6/2022 | Szolga, Jr. et al. |
| 2022/0285750 A1 | 9/2022 | Li et al. |
| 2022/0311068 A1 | 9/2022 | Wang et al. |
| 2022/0325378 A1 | 10/2022 | Wang et al. |
| 2022/0416325 A1 | 12/2022 | Gratz et al. |
| 2023/0038978 A1 | 2/2023 | Gratz et al. |
| 2023/0044374 A1 | 2/2023 | Wang et al. |
| 2023/0059571 A1 | 2/2023 | Arsenault et al. |
| 2023/0147371 A1 | 5/2023 | Wang et al. |
| 2023/0198040 A1 | 6/2023 | Wang et al. |
| 2023/0304128 A1 | 9/2023 | Akhondi et al. |
| 2023/0332272 A1 | 10/2023 | Katal et al. |
| 2024/0102127 A1 | 3/2024 | Alemrajabi et al. |
| 2024/0120565 A1 | 4/2024 | Katal |

FOREIGN PATENT DOCUMENTS

| | | | |
|---|---|---|---|
| CA | 3109084 A1 | 2/2020 | |
| CN | 101450815 A | 6/2009 | |
| CN | 101847663 A | 9/2010 | |
| CN | 102157726 A | 8/2011 | |
| CN | 102892708 A | 1/2013 | |
| CN | 104953200 A | 9/2015 | |
| CN | 103280610 B | 11/2015 | |
| CN | 105274332 A | 1/2016 | |
| CN | 106505225 A | 3/2017 | |
| CN | 107653378 A | 2/2018 | |
| CN | 107871912 A | 4/2018 | |
| CN | 107946687 A | 4/2018 | |
| CN | 109075407 A | 12/2018 | |
| CN | 110527836 A | 12/2019 | |
| CN | 110563021 A | 12/2019 | |
| CN | 111003736 A | 4/2020 | |
| CN | 111304441 A | 6/2020 | |
| CN | 111471864 A | 7/2020 | |
| CN | 111675203 A | 9/2020 | |
| CN | 112126783 A | 12/2020 | |
| CN | 112441572 A | 3/2021 | |
| CN | 113073194 A | 7/2021 | |
| CN | 115058605 A | 9/2022 | |
| EP | 2532759 A1 | 12/2012 | |
| EP | 2450991 B1 | 7/2013 | |
| EP | 2480696 B1 | 7/2018 | |
| EP | 3381080 A1 | 10/2018 | |
| GB | 2611158 A | 3/2023 | |
| JP | 2011157604 A | 8/2011 | |
| JP | 2011184764 A | 9/2011 | |
| JP | 5161361 B1 | 3/2013 | |
| JP | 2014156648 A | 8/2014 | |
| JP | 2016003382 A | 1/2016 | |
| JP | 2016060926 A | 4/2016 | |
| KR | 20110062307 A | 6/2011 | |
| KR | 20190009771 A | 1/2019 | |
| KR | 20210120669 A | 10/2021 | |
| RU | 2604082 C2 | 12/2016 | |
| TW | 202105823 A | 2/2021 | |
| TW | 202107764 A | 2/2021 | |
| TW | 202111131 A | 3/2021 | |
| WO | WO-2012026061 A1 | 3/2012 | |
| WO | WO-2013160754 A1 | 10/2013 | |
| WO | WO-2017091562 A1 | 6/2017 | |
| WO | WO-2018209164 A1 | 11/2018 | |
| WO | 2018227237 A1 | 12/2018 | |
| WO | WO-2018223193 A1 | 12/2018 | |
| WO | WO-2019149698 A1 | 8/2019 | |
| WO | WO-2019150403 A1 | 8/2019 | |
| WO | WO-2020109045 A1 | 6/2020 | |
| WO | WO-2020124130 A1 * | 6/2020 | ............. C22B 1/005 |
| WO | WO-2020220559 A1 | 11/2020 | |
| WO | 2021069822 A1 | 4/2021 | |
| WO | 2021161316 A1 | 8/2021 | |
| WO | WO-2021177537 A1 | 9/2021 | |
| WO | WO-21252433 A1 | 12/2021 | |
| WO | WO-2021242831 A2 | 12/2021 | |
| WO | WO-21252433 A9 | 1/2022 | |
| WO | WO-2022045973 A1 | 3/2022 | |
| WO | WO-2022062675 A1 | 3/2022 | |
| WO | WO-2022127117 A1 | 6/2022 | |
| WO | 2022167662 A1 | 8/2022 | |
| WO | WO-2022219221 A1 | 10/2022 | |
| WO | WO-2022219222 A1 | 10/2022 | |
| WO | WO-2022219223 A1 | 10/2022 | |
| WO | WO-2022221285 A1 | 10/2022 | |
| WO | WO-202272162 A1 | 12/2022 | |
| WO | WO-2023010969 A1 | 2/2023 | |
| WO | WO-2023015171 A1 | 2/2023 | |
| WO | WO-2023024599 A1 | 3/2023 | |
| WO | WO-2023034556 A1 | 3/2023 | |
| WO | WO-2023036726 A1 | 3/2023 | |
| WO | WO-2023136773 A1 | 7/2023 | |
| WO | WO-2023163658 A2 | 8/2023 | |

OTHER PUBLICATIONS

Beer et al., Battery Recycling Process, Jun. 2020, See the Abstract. (Year: 2020).*

International Search Report from corresponding PCT Application No. PCT/SG2021/050496 dated Nov. 10, 2021.

Written Opinion from corresponding PCT Application No. PCT/SG2021/050496 dated Nov. 10, 2021.

International Search Report and Written Opinion for International Publication No. WO2022/045973-A1 issued Oct. 11, 2021; 23 pages.

Xu, J., et al., "A review of the processes and technologies for the recycling of lithium-ion secondary batteries," Journal of Power Sources, 177: 512-527 (2008).

Freitas, M.B.J.G. & Garcia, E.M., "Electrochemical recycling of cobalt from cathodes of spent lithium-ion batteries," Journal of Power Sources, 171: 953-959 (2007).

(56) References Cited

OTHER PUBLICATIONS

Castillo, S., et al., "Advances in the recovering of spent lithium battery compounds," Journal of Power Sources, 112: 247-254 (2002).
Contestabile, M., et al., "A laboratory-scale lithium battery recycling process," Journal of Power Sources, 83: 75-78 (1999).
Zou, H., et al., "A novel method to recycle mixed cathode materials for lithium ion batteries," Green Chem, 15: 1183-1191 (2013).
Griesbeck, A.G., et al., "Intermolecular photodecarboxylation of electron-deficient substrates by phthalimides in water: efficiency, selectivity and online monitoring," Green Chem, 14: 3004-3006 (2012).
Gratz, E., et al., "A closed loop process for recycling spent lithium ion batteries," Journal of Power Sources, 262: 255-262 (2014).
Office Action from corresponding U.S. Appl. No. 18/112,818 dated Jun. 22, 2023.
Wang, H., et al., "Hydrometallurigcal processing of Li-Ion battery scrap from electric vehicles," European Metallurgical Conference, 2011, p. 1-26.
Office Action from corresponding Chinese Application No. 2021800522141 dated Aug. 28, 2023.
Office Action from corresponding Russian Application No. 2023106877 dated Sep. 12, 2023.
Search Report from corresponding Russian Application No. 2023106877 dated Sep. 11, 2023.
Bing Han, Rana Anwar Ul Haq, Marjatta Louhi-Kultanen, Lithium carbonate precipitation by homogeneous and heterogeneous reactive crystallization, 2020, Hydrometallurgy, vol. 195, (Year: 2020).
O. Sitando, P.L. Crouse, Processing of a Zimbabwean petalite to obtain lithium carbonate, 2012, International Journal of Mineral Processing, vols. 102-103 (Year: 2012).
Ulusoy Erol HB, Hestekin CN, Hestekin JA. Effects of Resin Chemistries on the Selective Removal of Industrially Relevant Metal ions Using Wafer-Enhanced Electrodeionization. 2021. Membranes. 11 (1):45. https://doi.org/10.3390/membranes11010045 (Year:2021).
Gao et. al. Lithium Carbonate Recovery from Cathode Scrap of Spent Lithium-Ion Battery a Closed-Loop Process, Jan. 12, 2017, Environmental Science & Technology 51 (3), 1662-1669, (Year: 2017).
Chao Peng, Fupeng Liu, Zulin Wang, Benjamin P. Wilson, Mari Lundstrom, Selective extraction of lithium (Li) and preparation of battery grade lithium carbonate (Li2C03) from spent Li-ion batteries in nitrate system, Journal of Power Sources, vol. 415, 2019, pp. 179-188 (Year: 2019).
Ahwadmin, What is Deionized Water, and What is it Used for?, Oct. 21, 2021, American Home Water & Air (Year: 2021).
Shakibania et al., The effect of the chloride ion on chemical degradation of LIX 984N extractant, 2020, Minerals Engineering (Year: 2020).
Office Action from corresponding U.S. Appl. No. 18/112,676, dated Oct. 24, 2023.
Final Office Action from U.S. Appl. No. 18/112,676 dated Mar. 8, 2024.
Examination Report from Australian Application No. 2021330014 dated Feb. 23, 2024.
Office Action and Search Report from Taiwan Application No. 112114238 dated Nov. 8, 2023.
Office Action and Search Report from Taiwan application No. 112106545 dated Oct. 16, 2023.
Office Action from Chinese Application No. 2021800522141 dated Dec. 4, 2023.
Examination Report from Australian Application No. 2021330014 dated Apr. 19, 2023.
Examination Report from Australian Application No. 2021330014 dated Nov. 22, 2023.
International Search Report from PCT Application No. PCT/SG2023/050108 dated Aug. 16, 2023.
Written Opinion from PCT Application No. PCT/SG2023/050108 dated Aug. 16, 2023.
International Search Report from PCT Application No. PCT/SG2023/050257 dated Aug. 2, 2023.
Written Opinion from PCT Application No. PCT/SG2023/050257 dated Aug. 2, 2023.
Ooi et al., (2017), "Recovery of lithium from salt-brine eluates by direct crystallization as lithium sulfate", Hydrometallurgy, 174, 123-130.
Rosales et al., (2014), "Novel process for the extraction of lithium from ?-spodumene by leaching with HF", Hydrometallurgy, 147-148.
International Search Report and Written Opinion from PCT Application No. PCT/SG2022/050014 dated Mar. 28, 2022.
Office Action from Korean Application No. KR 10-2023-7010188 dated Jan. 17, 2024.
Larouche, F. et al. (2020). Progress and Status of Hydrometallurgical and Direct Recycling of Li-Ion Batteries and Beyond. Materials 13:801.
Forte, F. et al. (2020). Lithium iron phosphate batteries recycling: An assessment of current status. Critical Reviews in Environmental Science and Technology, 1064:3389.
Yan et al. (2020). High-efficiency method for recycling lithium from spent LiFePO4 cathode. Nanotechnology Reviews, 9: 1586-1593.
Tasaki K. et al. (2003). Decomposition of LiPF6 and Stability of PF 5 in Li-Ion Battery Electrolytes: Density Functional Theory and Molecular Dynamics Studies. Journal of the Electrochemical Society 150.12, A1628.
Search Report and Written Opinion from Singapore Application No. 11202301039V dated Feb. 26, 2024.
Search Report from European Application No. 22893999.7 dated Mar. 11, 2024.
Examination Report from Australian Application No. 2023223959 dated Mar. 13, 2024.
Press et al. (2020). A Process for Recovering Metals From Recycled Rechargeable Batteries.
Extended European Search Report from European Application No. 21862212.4 dated May 3, 2024.
Examination Report from Canadian Application No. 3188399 dated May 22, 2024.
Pavon et al. Recovery of Al, Co, Cu, Fe, Mn, and Ni from Spent LIBs after Li Selective Separation by COOL-Process—Part 2: Solvent Extraction from Sulphate Leaching Solution, Oct. 1, 2022, Chemie IngenieurTechnik, 93, p. 1842.
Vittore et al. Edge-Oxidation of Graphites by Hydrogen Peroxide, Langmuir, 35, p. 2244.
Non-Final Office Action from U.S. Appl. No. 18/640,456 dated Jul. 12, 2024.
Search Report from Russian Application No. 2024104964 dated Apr. 23, 2024.
International Search Report and Written Opinion from PCT Application No. PCT/SG2024/050258 dated Jul. 22, 2024.
International Search Report and Written Opinion from PCT Application No. PCT/SG2024/050259 dated Jul. 22, 2024.
Examination Report from Malaysian Application No. PI2023000788 dated Nov. 8, 2024.
Substantive Examination Report from Indonesian Application No. P00202302236 dated Oct. 31, 2024.

\* cited by examiner

PROCESS FOR REMOVING IMPURITIES IN THE RECYCLING OF LITHIUM-ION BATTERIES

CROSS-REFERENCE TO RELATED APPLICATIONS

This patent application is a continuation of U.S. patent application Ser. No. 18/112,818 filed on 22 Feb. 2023, which is a continuation of International Patent Application No. PCT/SG2021/050496, which has an international filing date of 24 Aug. 2021, which claims priority to and benefit under 35 U.S.C. § 119 to U.S. Provisional Application No. 63/069,488 filed on 24 Aug. 2020. The contents of each application recited above are incorporated herein by reference in their entirety.

FIELD OF INVENTION

The present invention generally relates to a method for recycling spent lithium-ion batteries. More particularly, it relates to a method for removal of impurities from a leaching solution of spent lithium-ion batteries.

BACKGROUND

Lithium-ion batteries contain valuable precious metals which would go to waste when the batteries are spent and discarded. With the rising use of lithium-ion batteries, the recovery of precious metals from spent lithium-ion batteries have become an important industry.

Typically, spent lithium-ion batteries are dismantled, crushed, or shredded to form a black mass to prepare them for recycling. Current lithium-ion battery recycling efforts are often primarily focused on recovering the precious metals cobalt and lithium from lithium cobalt oxide cathodes. However, there are many other types of cathode materials used in lithium-ion batteries. A significant portion of these cathode materials include other precious metals such as nickel and manganese. Conventional recycling methods do not adequately handle the recycling of different types of lithium-ion battery cathode materials and fail to sufficiently address the extraction of these other precious metals.

Further, black mass, especially those derived collectively from different types of lithium-ion batteries contains many types of impurities. Failing to effectively remove them adversely affects the purity of precious metals recovered from recycling. Present efforts of impurity removal involve numerous steps requiring many reactors and filters. Not only does this lengthen the entire recycling process, but with each reactor or filter, valuable material is lost along the way resulting in a severe reduction in the amount of precious metals available for recovery.

Thus, there exists a need for a lithium-ion battery recycling process which can better handle the removal of impurities in black mass, especially that derived collective from different types of lithium-ion batteries. There also exists an associated need to remove impurities in a more efficient way that requires less equipment and results in less reduction in the amount of precious metals available for recovery.

The invention seeks to answer these needs. Further, other desirable features and characteristics will become apparent from the rest of the description read in conjunction with the accompanying drawings.

SUMMARY

In accordance with the present invention, a method of treating a leaching solution derived from a black mass is provided. The method comprises setting pH of the leaching solution to about pH 1.2 to 2.15, adding iron powder to induce copper cementation, adding lime after copper cementation, and after adding lime, transiting pH of the leaching solution to about pH 6 to extract calcium fluoride, titanium hydroxide, aluminium hydroxide, iron hydroxide, and iron phosphate. Preferably, about 2.5 g of iron powder is added for each litre of the leaching solution. More preferably, the iron powder may be added over a period of about 15 minutes. Preferably, the lime is calcium oxide and about 20-40 g of calcium oxide is added for each kg of black mass. Alternatively, the lime is calcium hydroxide and about 30-60 g of calcium hydroxide is added for each kg of black mass. Preferably, the leaching solution is derived from the black mass by leaching the black mass with sulfuric acid and hydrogen peroxide. Preferably, the sulfuric acid is 4M sulfuric acid, and about 6 litres of sulfuric acid is added for each kg of the black mass. Preferably, about 50 ml of hydrogen peroxide (30% concentration) per litre of solution is added. Preferably, the sulfuric acid and hydrogen peroxide are added in consecutive order. The method may further comprise agitating the black mass, sulfuric acid, and hydrogen peroxide for a period of 1 hour. The method may further comprise diluting the sulfuric acid to 2M by adding deionised water after the period of 1 hour.

In another aspect, a black mass recycling system is provided. The black mass recycling system comprises an impurity removal reactor configured to receive a sodium hydroxide feed, an iron powder feed, and a lime feed. Preferably, the black mass recycling system may further comprise a leaching reactor configured to receive a sulfuric acid feed, a hydrogen peroxide feed, and a deionised water feed, and a first valved outlet associated with the leaching reactor providing fluid communication between the leaching reactor and the impurity removal reactor. More preferably, the black mass recycling system may further comprise an impurity removal agitator provided within the impurity removal reactor, and a leaching reactor agitator provided within the leaching reactor.

DETAILED DESCRIPTION

In the following detailed description, reference is made to the accompanying drawings which form a part hereof. The processes and systems described in the detailed description and drawings are for illustrative purposes and are not meant to be limiting. Other embodiments can be utilised, and other changes can be made, without departing from the scope of the disclosure presented herein. In the present disclosure, the depiction of a given element or consideration or use of a particular element number in a particular Fig. or a reference thereto in corresponding descriptive material can encompass the same, an equivalent, or an analogous element or element number identified in another Fig. or descriptive material associated therewith.

Figure 1:
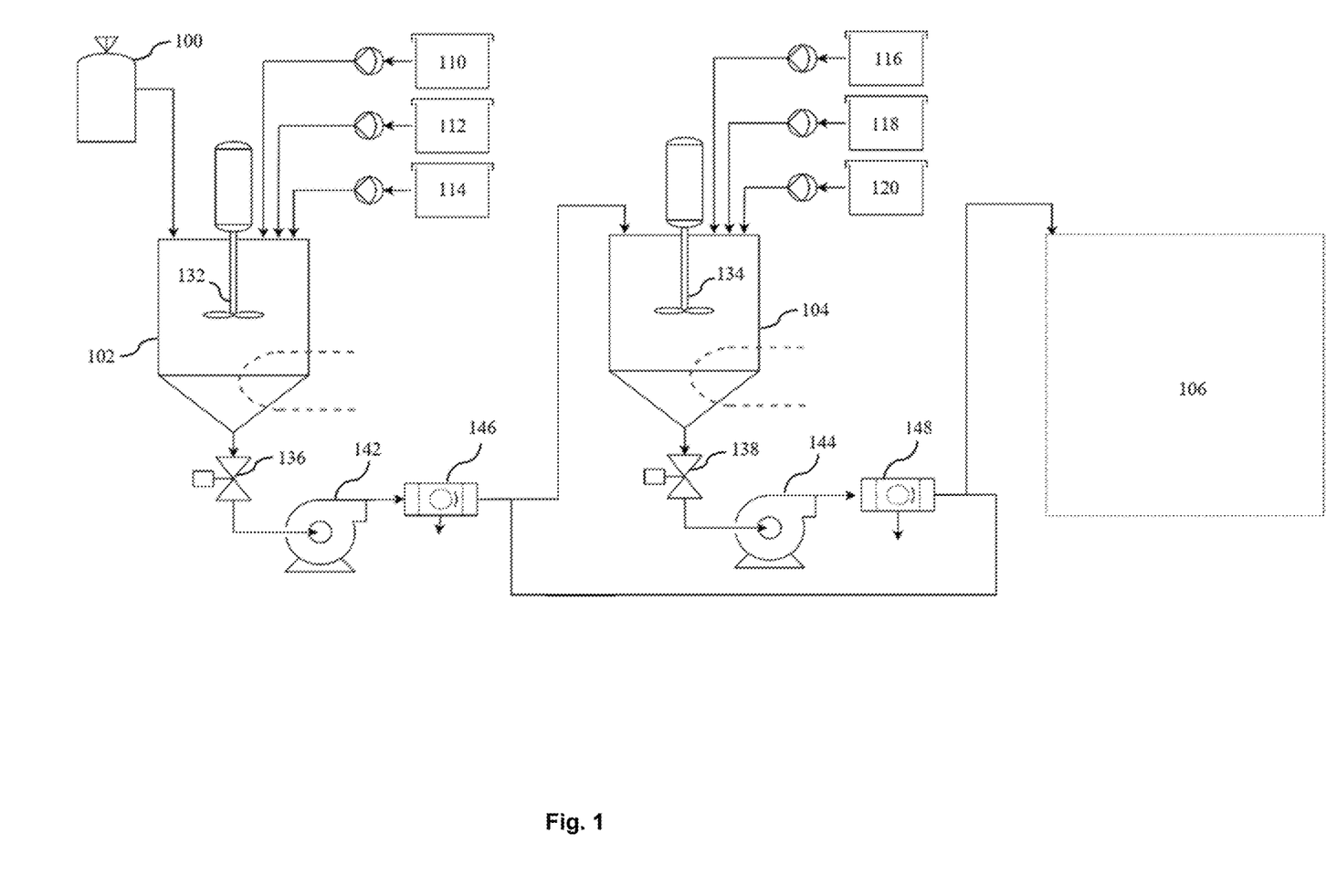
FIG. 1 is a process flow diagram of a process of leaching and removal of impurities.

Black mass is poured from its holding container 100 into a first reactor, namely a leaching reactor, 102. The black mass may collectively include lithium-ion batteries with cathodes made from lithium cobalt oxide (LCO), lithium manganese oxide (LMO), lithium nickel manganese cobalt oxide (NMC), lithium iron phosphate (LFP), lithium nickel cobalt aluminium oxide (NCA), and lithium titanate (LTO). As a result, the black mass comprises impurities of iron, copper, fluorine, phosphorous, titanium and aluminium.

In the first phase of leaching, an inorganic acid, preferably sulfuric acid ($H_2SO_4$), provided from an inorganic acid source 110 is added to the black mass in the first reactor 102, forming a solution. Preferably, a proportion of about 1 kg of black mass to about 6 litres of 4M sulfuric acid is observed. The inorganic acid may optionally be hydrochloric acid subject to adjustments to quantities of the reagents described below which should be apparent to a skilled person.

Hydrogen peroxide ($H_2O_2$), preferably about 50 ml of hydrogen peroxide (30% concentration) per litre of the solution, is provided to the contents of the first reactor 102 from a hydrogen peroxide source 112 to facilitate leaching as a co-digestant. The contents of the first reactor 102 undergoes agitation by an agitator 132, preferably for about 1 hour. During the first phase of leaching, the sulfuric acid increases the availability of sulfate ions ($SO_4^{2-}$) which react with iron present in the black mass to form ferrous iron ($Fe^{3+}$). The hydrogen peroxide then oxidises the ferrous iron ($Fe^{2+}$) to ferric iron ($Fe^{3+}$). The ferric iron then reacts with the sulfate ions to produce iron sulfate ($Fe_2(SO_4)_3$).

In the second phase, deionised water is added into the first reactor 102 from a deionised water source 114 to dilute the sulfuric acid in the first reactor 102, preferably to about 2M. Agitation of the contents of the first reactor 102 is maintained by the agitator 132 for about 30 minutes.

During both the first and second phases of leaching, the temperature of the contents in the first reactor 102 should be maintained at 70-90° C. A skilled person should readily understand that the amount of sulfuric acid, hydrogen peroxide and deionised water may be adjusted according to the amount of black mass processed.

After the first and second phases of leaching, the leaching solution from the first reactor 102 is released via an outlet valve 136 and transferred into a second reactor 104 by way of a pump 142. The following describes the processes of removing the impurities copper, fluorine, phosphate, iron, titanium, and aluminium from the leaching solution in the second reactor 104, during which the contents of the second reactor 104 are continually agitated by an agitator 134.

Figure 2:
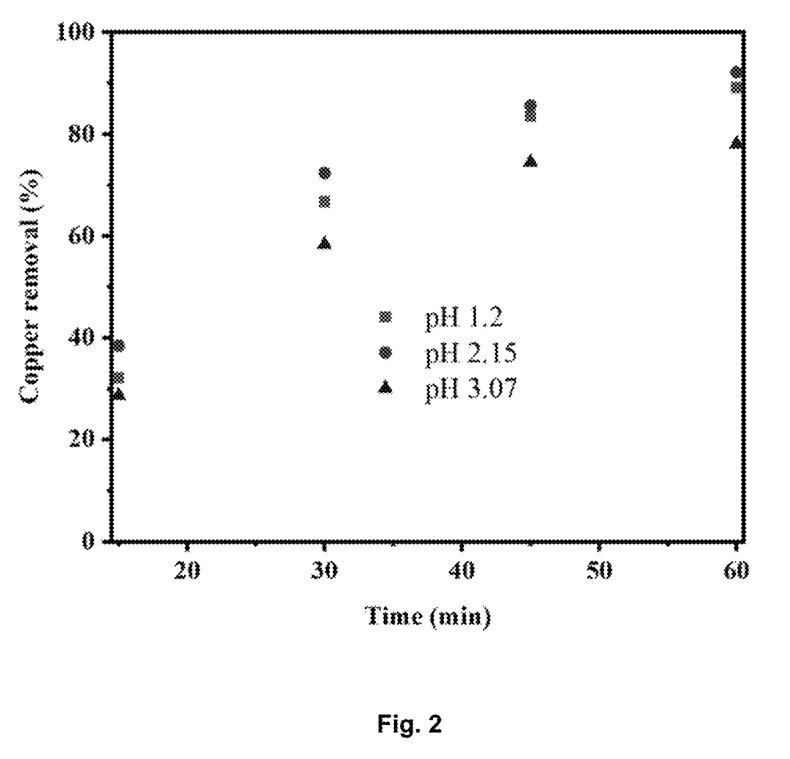
FIG. 2 is a graph (Graph 1) showing the effect of pH on copper cementation over time.

Sodium hydroxide (NaOH) from a sodium hydroxide source 116 is added to the leaching solution in the second reactor 104 to set the pH of the leaching solution at a value of about pH 1.2 to 2.15. Iron (Fe) powder is added from an iron powder source 118, preferably about 2.5 g of iron powder per litre of leaching solution, to the leaching solution over about 15 minutes while maintaining the temperature of the contents of the second reactor at about 60° C. Capitalising on the reductive capacity of ignoble metals on noble metal ions according to the electromotive force series (i.e., voltage gap between two half-cell reactions corresponds to higher propensity of reaction from a thermodynamic and electrochemistry standpoint), the iron powder will react favourably with copper in the leaching solution, leading to the cementation of copper:

FIG. 2 records the effect of copper cementation over a period of 60 minutes as a result of setting the pH of the leaching solution at 1.2, 2.15 and 3.07 respectively. The concentration of copper in the leaching solution is taken and computed to give a copper removal percentage during the period of 60 minutes as follows:

$$\frac{\text{Initial concentration of copper} - \text{final concentration of copper}}{\text{Initial concentration of copper}} \times 100$$

It is observed that setting a pH of 1.2 or 2.15 results in the cementation of about 90% of copper in the leaching solution, that is, copper removal. When the pH is set at 3.07, cementation of copper in the leaching solution drops to below 80% over the same period.

The sulfuric acid and hydrogen peroxide added from the first phase of leaching in the first reactor 102 forms part of the contents of the second reactor 104. The hydrogen peroxide oxidises the ferrous iron (Fe') formed during copper cementation to ferric iron ($Fe^{3+}$). The ferric iron reacts with the sulfate ions to produce iron sulfate ($Fe_2(SO_4)_3$).

Some fluoride may be removed during the leaching process in the first reactor 102, but sufficiently undesirable and toxic amounts which may result in capacity attenuation of lithium-ion batteries that may eventually be produced will remain as fluoride ions in the leaching solution transferred to the second reactor 104. Lime is added from a lime source 120 to the contents of the second reactor 104, preferably about 20-40 g of calcium oxide or about 30-60 g of calcium hydroxide per kg of the black mass previously added into the first reactor 102. After the addition of lime, the contents of the second reactor 104 is left to rest (with continued agitation) for a period of about 30 minutes at about 40° C.

Lime should be added only after the iron powder has completed the cementation of copper from the contents of the second reactor 104 to avoid the lime interfering with the capacity of the iron powder to induce copper cementation.

Figure 3:
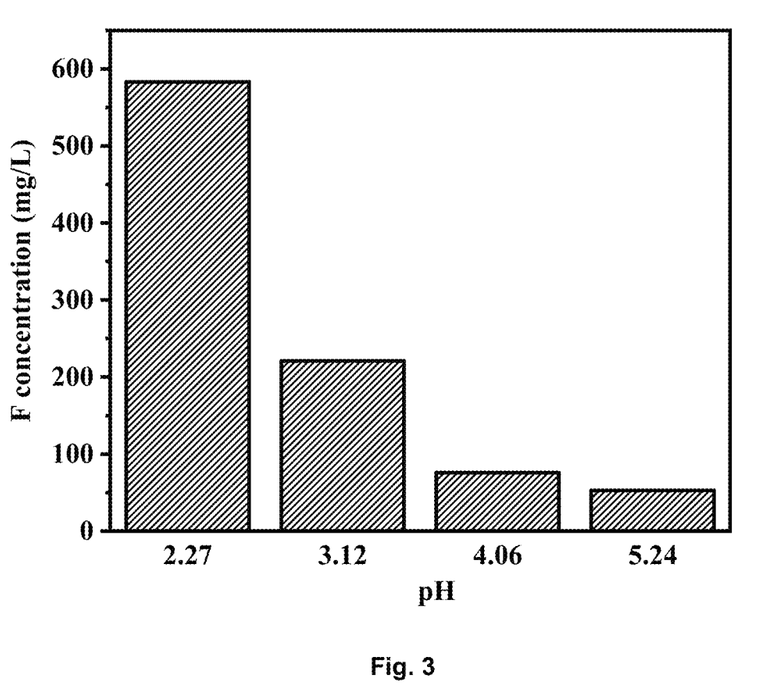
FIG. 3 is a graph (Graph 2) showing the effect of pH on fluoride concentration in solution.

After the rest period of about 30 minutes, more sodium hydroxide is added to the second reactor 104 to transition the pH of its contents to about pH 6. The pH transition triggers precipitation of the other impurities (fluorine, iron, phosphorus, titanium, and aluminium) in the leaching solution transferred from the first reactor 102 to the second reactor 104. From about pH 2.2, fluoride starts to precipitate as calcium fluoride ($CaF_2$):

FIG. 3 records the concentration of fluoride in the leaching solution that started at an initial concentration of 650 mg/l after 60 minutes at pH 2.27, 3.12, 4.06 and 5.24 respectively. It is observed that the concentration of fluoride is reduced consecutively and significantly at pH 3.12, 4.06 and 5.24, while the concentration of fluoride is not as significantly reduced at pH 2.27.

As the pH of the contents of the second reactor 104 rises to about pH 3, the sodium hydroxide causes iron ions, whether originally in the leaching solution or added for copper cementation, to precipitate as iron hydroxide. The remaining iron that is not precipitated as iron hydroxide reacts with phosphate ions ($PO_4^{3-}$) in the contents of the second reactor 104 to precipitate as iron phosphate ($FePO_4$).

TABLE 1

The effect of pH on iron (Fe) and
Phosphorus (P) precipitation

| pH | Fe(%) precipitation | P(%) Precipitation |
|---|---|---|
| 2.5 | — | — |
| 3 | 10.74 | 13.51 |
| 3.5 | 59.45 | 51.68 |
| 4 | 100 | 89.12 |
| 4.5 | 100 | 100 |

Table 1 records the percentage of iron and phosphorus originally existing in the leaching solution which were precipitated as iron phosphate at pH values between pH 2.5 to 4.5 over 60 minutes. It is observed that precipitation occurred from pH 3 and increases at each pH value observed through to pH 4.5 where essentially all iron and phosphorus which existed in the leaching solution were precipitated.

As the pH of the contents of the second reactor 104 rises to and exceeds pH 4, the hydrogen peroxide which was added in the first reactor 102 and transferred in the leaching solution to the second reactor 104 pushes the oxidative states of titanium and aluminium to titanium (V) and aluminium (III) respectively, thus initiating precipitation of their hydroxides $Ti(OH)_4$ and $Al(OH)_3$.

Once the pH reaches about pH 6, the contents of the second reactor 104 is left to rest (with continued agitation) for about 60 minutes at about 60° C. After the period of 60 minutes, the contents of the second reactor 104 is released from the second reactor 104 by an outlet valve 138 and is passed through a filter 148 to remove copper and the precipitates (calcium fluoride, iron phosphate, iron hydroxide, titanium hydroxide, and aluminium hydroxide), thereby removing a significant amount of the impurities that originally existed in the black mass.

Figure 4:
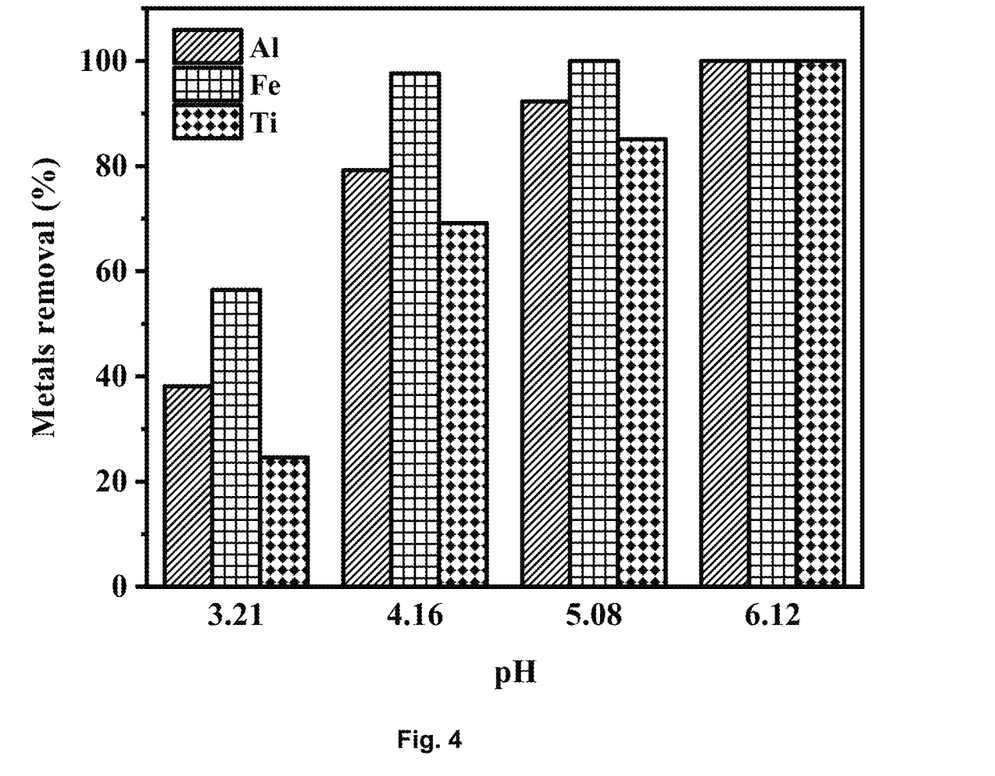
FIG. 4 is a graph (Graph 3) showing the effect of pH on the iron, aluminium and titanium concentration.

FIG. 4 records the concentration of aluminium, iron and titanium in the leaching solution that started at an initial concentration of 2.26, 0.2, and 1.1 g/l respectively after of a period of 30 minutes at pH 3.21, 4.16, 5.08 and 6.12 respectively. The concentration of aluminium, iron and titanium in the leaching solution is taken and computed to give a removal percentage after the period of 30 minutes as follows:

$$\left(\frac{\text{Initial concentration} - \text{final concentration}}{\text{Initial concentration}}\right) \times 100$$

It is observed that the concentration of aluminium, iron and titanium reduced significantly at pH 4.16, 5.08 and 6.12 compared to pH 3.21.

The leaching process in the first reactor 102 and precipitation reactions in the second reactor 104 take about 3-4 hours in total, at the end of which less than 10 mg/l of impurities from the black mass remains in the contents of the second reactor 104.

While various aspects and embodiments have been disclosed herein, it will be appreciated by a person skilled in the art that several of the above-disclosed structures, parameters, or processes thereof, can be desirably modified, adapted and combined into alternative structures, processes and/or applications. It is intended that all such modifications, alterations, adaptations, and/or improvements made to the various embodiments that are disclosed come within the scope of the present disclosure. The various aspects and embodiments disclosed herein are for purposes of illustration and are not intended to be limiting, with the true scope of the disclosure being indicated by the following claims.

The invention claimed is:

1. A method of treating a leaching solution, the method comprising:
    setting pH of the leaching solution to at least about 1.2, wherein the leaching solution is derived from a black mass comprising fluorine and phosphorous;
    adding iron powder to induce copper cementation;
    after copper cementation, adding lime; and
    after adding lime, increasing pH of the leaching solution to extract calcium fluoride, and iron phosphate.

2. The method according to claim 1, wherein about 2.5 g of iron powder is added for each litre of the leaching solution and/or is added over a period of about 15 minutes.

3. The method according to claim 1, wherein the lime is calcium oxide and about 20-40 g of calcium oxide is added for each kg of black mass or the lime is calcium hydroxide and about 30-60 g of calcium hydroxide is added for each kg of black mass.

4. The method according to claim 1, wherein the leaching solution is derived from the black mass by leaching the black mass with an inorganic acid and hydrogen peroxide.

5. The method according to claim 4, wherein the inorganic acid and hydrogen peroxide are added in consecutive order.

6. The method according to claim 4, wherein the black mass, inorganic acid, and hydrogen peroxide are agitated for a period of 1 hour.

7. The method according to claim 4, wherein the inorganic acid comprises sulfuric acid or hydrochloric acid.

8. The method according to claim 7, wherein the sulfuric acid is 4M sulfuric acid and about 6 litres of sulfuric acid is added for each kg of the black mass.

9. The method according to claim 8, further comprising diluting the sulfuric acid to about 2M by adding deionised water after a period of 1 hour.

10. The method according to claim 1, wherein the increasing pH of the leaching solution comprises adding sodium hydroxide to the leaching solution to increase pH of the leaching solution to about 6.

11. The method according to claim 1, further comprising extracting titanium hydroxide, aluminium hydroxide, and iron hydroxide, wherein the black mass further comprises iron, copper, titanium, and aluminium.

12. A method of treating a leaching solution, the method comprising:
    setting pH of the leaching solution to at least about 1.2, wherein the leaching solution is derived from a black mass comprising fluorine and phosphorous;
    adding lime; and
    increasing pH of the leaching solution to extract calcium fluoride, iron phosphate, and iron hydroxide.

13. The method according to claim 12, further comprising adding iron powder to induce copper cementation and adding the lime after copper cementation.

14. The method according to claim 12, wherein the lime is calcium oxide and about 20-40 g of calcium oxide is added for each kg of black mass or the lime is calcium hydroxide and about 30-60 g of calcium hydroxide is added for each kg of black mass.

15. The method according to claim 12, wherein the leaching solution is derived from the black mass by leaching the black mass with an inorganic acid and hydrogen peroxide.

16. The method according to claim 15, wherein the inorganic acid comprises sulfuric acid or hydrochloric acid.

17. The method according to claim 12, wherein the increasing pH of the leaching solution comprises adding sodium hydroxide to the leaching solution to increase pH of the leaching solution to about 6.

18. The method according to claim 12, further comprising extracting titanium hydroxide, and aluminium hydroxide, wherein the black mass further comprises iron, copper, titanium, and aluminium.

19. A black mass recycling system comprising:
a leaching reactor configured to receive an inorganic acid feed, a hydrogen peroxide feed, a deionised water feed, and a black mass feed comprising fluorine and phosphorous;
an impurity removal reactor configured to receive a sodium hydroxide feed, a lime feed, and a leaching solution from the leaching reactor and comprising an outlet configured to remove calcium fluoride, iron phosphate, and iron hydroxide; and
a first valved outlet associated with the leaching reactor providing fluid communication between the leaching reactor and the impurity removal reactor.

20. The black mass recycling system according to claim 19, wherein the black mass feed further comprises iron, copper, titanium, and aluminium and the impurity removal reactor is further configured to receive an iron powder feed.

* * * * *